(12) United States Patent
Meijer et al.

(10) Patent No.: US 7,970,730 B2
(45) Date of Patent: Jun. 28, 2011

(54) EFFICIENT DATA ACCESS VIA RUNTIME TYPE INFERENCE

(75) Inventors: Henricus Johannes Maria Meijer, Mercer Island, WA (US); Oludare Victor Obasanjo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 11/044,100

(22) Filed: Jan. 27, 2005

(65) Prior Publication Data

US 2006/0167880 A1   Jul. 27, 2006

(51) Int. Cl.
*G06F 7/00* (2006.01)
*G06F 17/00* (2006.01)

(52) U.S. Cl. .................. 707/601; 707/604

(58) Field of Classification Search .......... 707/9, 100, 707/101, 601, 604
See application file for complete search history.

(56) References Cited

U.S. PATENT DOCUMENTS

| | | | |
|---|---|---|---|
| 6,631,519 B1* | 10/2003 | Nicholson et al. | 717/169 |
| 2002/0199031 A1* | 12/2002 | Rust et al. | 709/315 |
| 2003/0097637 A1* | 5/2003 | Tozawa et al. | 715/513 |
| 2003/0120642 A1 | 6/2003 | Egilsson et al. | |
| 2003/0167444 A1* | 9/2003 | Zorc | 715/513 |
| 2004/0268234 A1* | 12/2004 | Sampathkumar et al. | 715/513 |

OTHER PUBLICATIONS

European Search Report dated May 19, 2006 for European Patent Application Serial No. 05112942, 4 Pages.
David Mertz: "XML Matters: On the 'Pythonic' treatment of XML documents as objects (II)" ibm developerworks, Aug. 1, 2000, pp. 1-5.
Dennis Sosnoski: "XML and Java technologies: Data binding, Part 1: Code generation approaches—JAXB and more" IBM Developerworks, Jan. 1, 2003, pp. 1-11.
Fan-Zi Zeng, et al.: "A survey of classification learning algorithm" Signal Processing, 2004. Proceedings. ICSP '04. 2004 7th International Conference on Beijing, China Aug. 31-Sep. 4, 2004, Piscataway, NJ, USA, IEEE, pp. 1500-1504.
Sampathkumar, Nithya "Using the XSD Inference Utility" Microsoft Corporation Feb. 12, 2003.

* cited by examiner

*Primary Examiner* — Apu M Mofiz
*Assistant Examiner* — Jared M Bibbee
(74) *Attorney, Agent, or Firm* — Workman Nydegger

(57) ABSTRACT

A system and methodology that provide schema inferencing at runtime. An inference component receives as an input an input data stream, and processes the input data stream at runtime to develop a schema based on actual values thereof. The inferred schema is then used to create an inferred output data that is a specialized representation of the input stream data, which can then be accessed efficiently and conveniently.

12 Claims, 10 Drawing Sheets

EFFICIENT DATA ACCESS VIA RUNTIME TYPE INFERENCE

TECHNICAL FIELD

This invention is related to data processing techniques, and more specifically, to type inferencing based on input data sets.

BACKGROUND OF THE INVENTION

Type inference is the process whereby a compiler tries to determine the types of expressions and variables, given an inevitable lack of complete type information. The compiler is inferring the missing type information based on contextual information of the input data stream. Difficulty can be with arithmetic operators, for example, where the same syntax is used for integer and floating point arithmetic operations. This creates a problem for type inference because it is not possible to unambiguously reconstruct type information for a function such as fn n=>n+n. This simplistic function is ambiguous because there is no way to tell whether the addition operation is integer or floating point addition. For example, this expression can be interpreted as abbreviating fn n:int=>n+n, with type int→int, or fn n:real=>n+n, with type real→real.

In some cases the surrounding context is used to determine what is meant. A related source of difficulty is a "sharp" notation for records. Absent information from the context, the type of a function that uses these notations cannot be determined. Therefore this function will be rejected as ambiguous because there is insufficient information to determine the domain type of the function.

The above examples illustrate situations where ambiguity leads to difficulties; however, it cannot be concluded that type inference will fail unless the missing type information can be uniquely determined. In many cases there is no unique way to infer omitted type information; however, there can be a best way.

One of the main advantages of XML (eXtensible Markup Language) is that documents can be processed without a priori knowing their exact schema. However, manipulating languages such as C# or Java force programmers to use a verbose, interpretative, and computationally inefficient programming model to access such untyped documents, as represented in the following code.

```
XmlDocument b = new XmlDocument( ); b.Load(...);
string s = b.GetElementsByTagName("Title")[0].Value;
```

If the schema or type of a value is known, it is desired to provide more efficient access to parts of the value, that is, it would be desirable to compile access patterns assuming type information. Without assuming schema information, values have to be represented using some form of universal representation, and access is necessarily interpretative. When the schema of the document is known at compile time, a set of classes can be generated that correspond to the schema, the document can be deserialized into an object graph, and programmed against the document in a concise, strongly typed, and computationally efficient manner, as represented by the following code.

```
Book b = new XmlSerializer(typeof(Book)).Deserialize(...);
string s = b.Title;
```

However, this has shortcomings, in that, in many cases there is no schema available at compile time, and one is forced to use the interpretative approach. Databases and contemporary programming languages such as C# and Java deal very poorly with non-static types. Scripting languages such as Perl, Python, Ruby, PHP, Groovy, deal well with dynamic types but at the cost of not being robust and not scaling well to large software systems. Thus, there is a substantial unmet need in the prior art for a mechanism that provides improved data access across dynamic and statically typed languages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention bridges the gap between purely dynamically and purely statically typed languages by using a schema inference on actual values at runtime, and to use that schema to create a specialized representation of the data that can be accessed efficiently and conveniently. Assuming late-bound access to objects (e.g., in Visual Basic, and scripting languages such as ECMAScript, Python, and Perl), this invention combines the efficiency of early bound access via object serialization with the flexibility of untyped document access.

The invention disclosed and claimed herein, in one aspect thereof, comprises a system that includes an inference component which receives as an input an input data stream. The inference component processes the input data stream at runtime to develop a schema based on actual values thereof. The inferred schema is then used to create an inferred output data that is a specialized representation of the input stream data, which can then be accessed efficiently and conveniently.

In another aspect of the subject invention there is provided a methodology of optimizing a runtime inference process by employing caching at all or selected points of the process. The methodology includes a cache manager that provides caching at all or selected points during the runtime process by caching the input data and/or interim data and/or code in a cache memory.

In yet another aspect of the subject invention there is provided a methodology of processing a runtime type inference of an XML document in accordance with the invention.

In still another aspect of the subject invention, there is provided a methodology of optimizing the processing of similar input data at runtime. In the case where several documents are loaded sequentially, the methodology provides validation of the next document against the previously inferred schema and, if validation succeeds, a new schema need not be inferred. For example, after the first schema inferred at runtime, and the second data set is received, a metric is employed that compares the success (or failure) of the schema against the second data set. If the success falls below the criteria, a new schema is inferred from the second data set, and so on. Otherwise, the first schema continues to be applied against the second data set.

In another aspect thereof, there is provided a methodology of optimizing a runtime inference process by refining an inferred schema over time in accordance with the invention. The inferred schema can be refined over time whenever another document is loaded. Having a more precise type allows for more efficient access.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
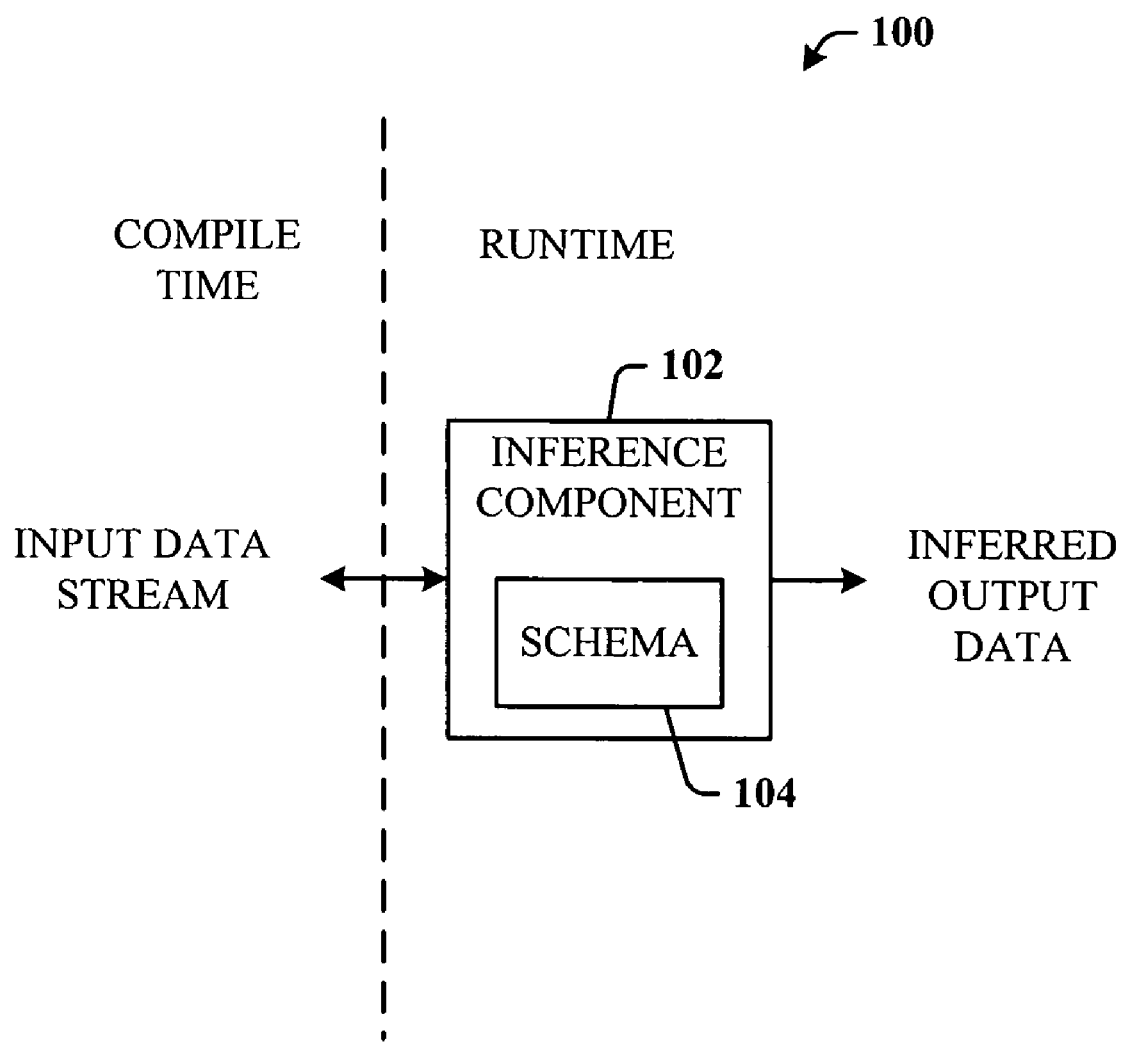
FIG. 1 illustrates a type inference system that infers a schema at runtime in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a type inference system 100 that infers a schema at runtime in accordance with the subject invention. The main aspect of the invention is to use schema inference on actual values at runtime, and use that schema to create a specialized representation of the data that can be accessed efficiently and conveniently.

Continuing with the example supra, and assuming late-bound access to values of a type object (e.g., in Visual Basic) the novel mechanism can be expressed using the following pseudo-code:

```
XmlDocument d = new XmlDocument( ); d.Load(...);
Type T = InferSchemaAndGenerateCode(d);
object b = new XmlSerializer(T).Deserialize(...);
object s = b.Title;
```

The actual document instance d can be used to generate a runtime type T that is then used to deserialize the document d into an object graph of dynamic type T. Since T is not known statically, the document can be programmed against only in a late-bound fashion (assuming that it has static type object). Here, it is much more efficient to load the document (Xml-Document d) into an object representation, and then access the title because of the capability of doing normal object processing. The code object b=new XmlSerializer(T).Deserialize( . . . ); and object s=b.Title; define late-bound access to the object because it is not known statically when the code is written what type b will be. However, it is still desired to be accessed.

Referring to the second example in the Background section, in accordance with the subject invention, the type Book does not need to be defined until runtime.

There are several ways to enhance the efficiency of this process. Firstly, various caching strategies can be performed in the InferSchemaAndGenerateCode algorithm. In the case where several documents are loaded sequentially, for example, it may be desired to first validate the next document against the previously inferred schema and, if it succeeds, a new schema need not be inferred and a new type generated.

Alternatively, the initially inferred schema can be refined over time whenever another document is loaded. Having a more precise type allows for more efficient access. These optimizations are described infra.

In support thereof, there is provided the system 100 which includes an inference component 102 that receives as an input a data stream. The inference component 102 processes the input data stream to infer a schema 104 at runtime based on actual values of the input data. The schema 104 is then used to create an inferred output data that is a specialized representation of the input stream data, and which can then be accessed efficiently and conveniently.

Figure 2:
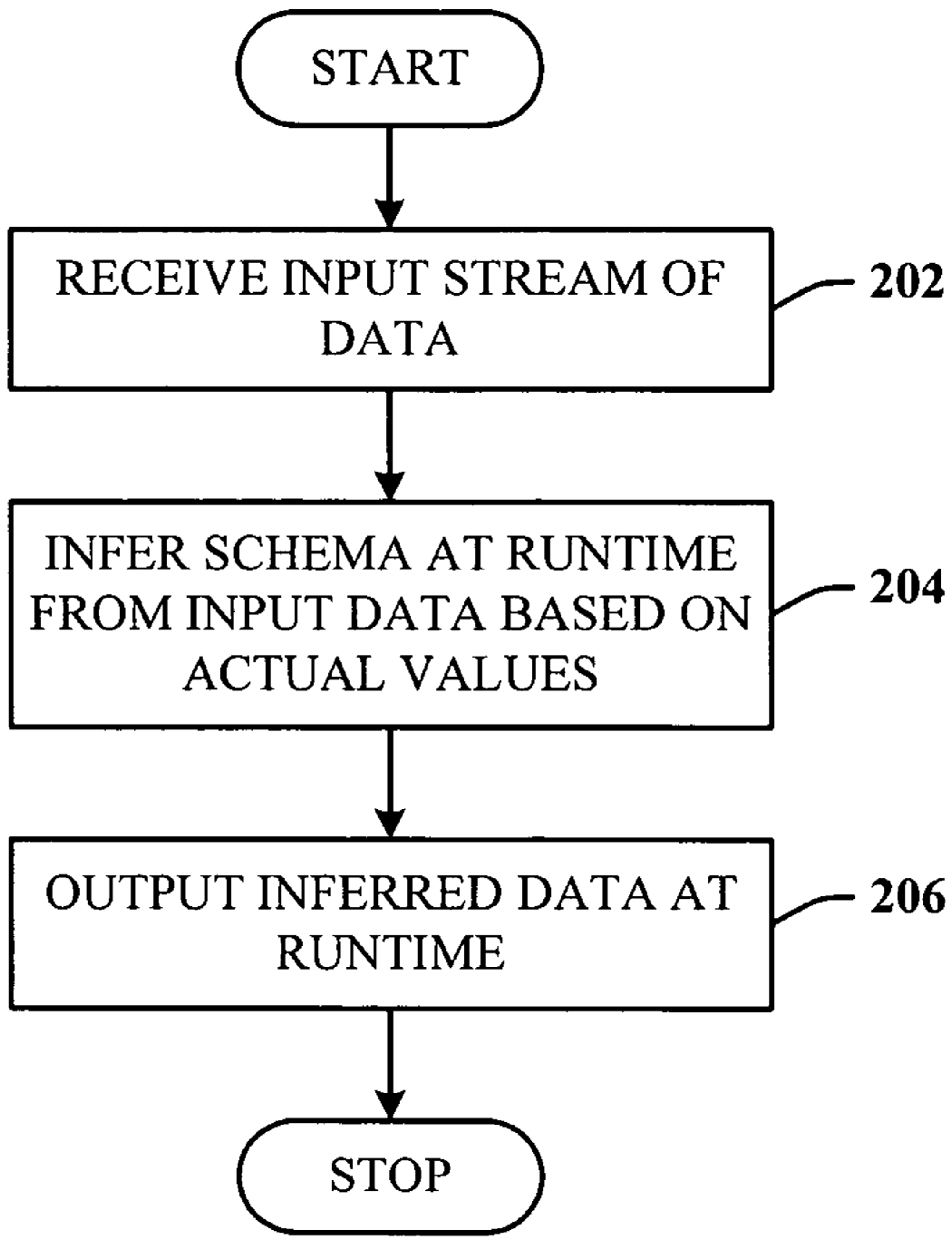
FIG. 2 illustrates a methodology of providing runtime type inference in accordance with the invention.

FIG. 2 illustrates a methodology of providing runtime type inference in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, the system receives an input data stream. This input data can be in the form of XML (eXtensible Markup Language) documents, data that is compatible with languages described by context-free grammars, and data in the form of relational tables that are described by relational schemas, to name just a few. At 202, the inference component processes the input data stream to infer a schema therefrom at runtime. At 204, the schema is utilized to generate the inferred output data based on actual values of the input data stream.

Figure 3:
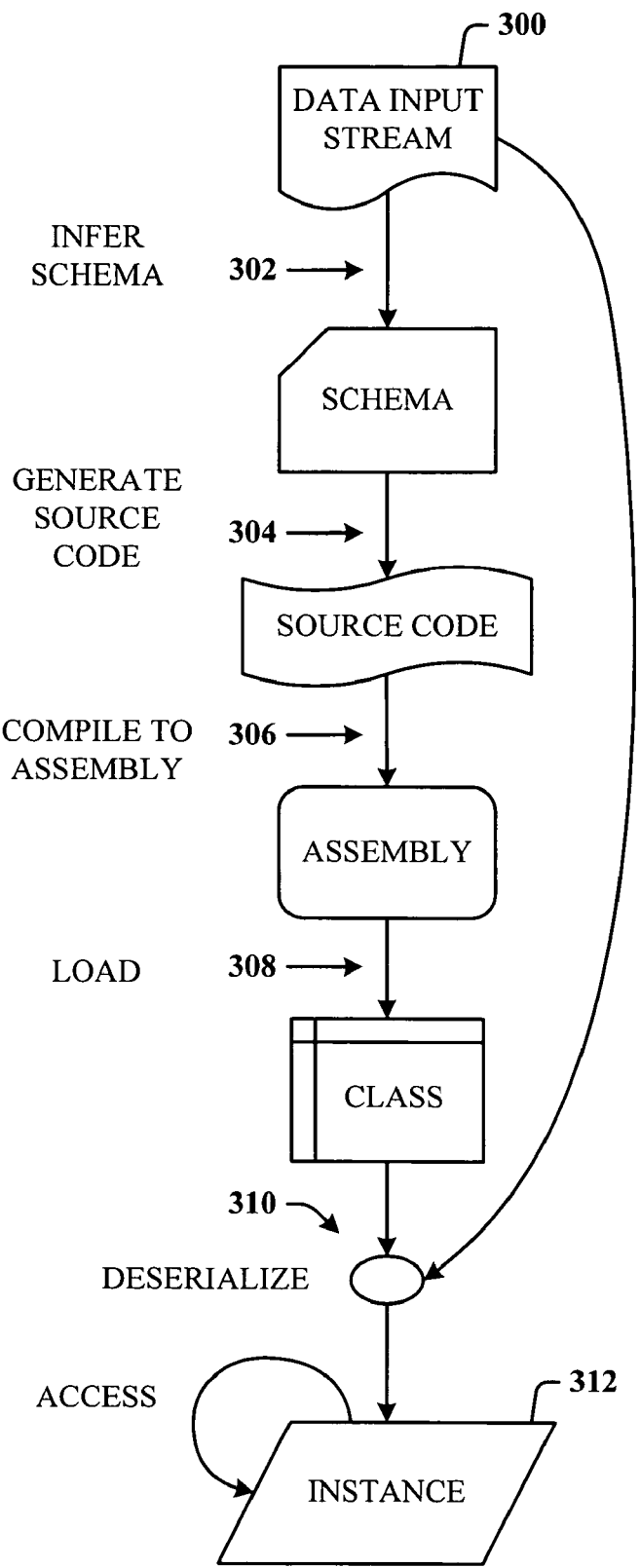
FIG. 3 illustrates a generalized methodology of runtime type inference in accordance with the invention.

Referring now to FIG. 3, there is illustrated a generalized methodology of runtime type inference in accordance with the invention. An input stream of data 300 is received as input to the runtime process. At 302, a schema is inferred for the input data at runtime. At 304, source code is generated from the inferred schema. At 306, the source code is compiled into assembly code, which can be executable code. At 308, the assembly code is processed against the types of the input data 300, and the generated classes are loaded into memory. At 310, the classes are used in deserialization of the original data input stream 300 to generate an instance 312 of the newly-created and loaded class. The instance 312 can then be accessed efficiently and conveniently.

Figure 4:
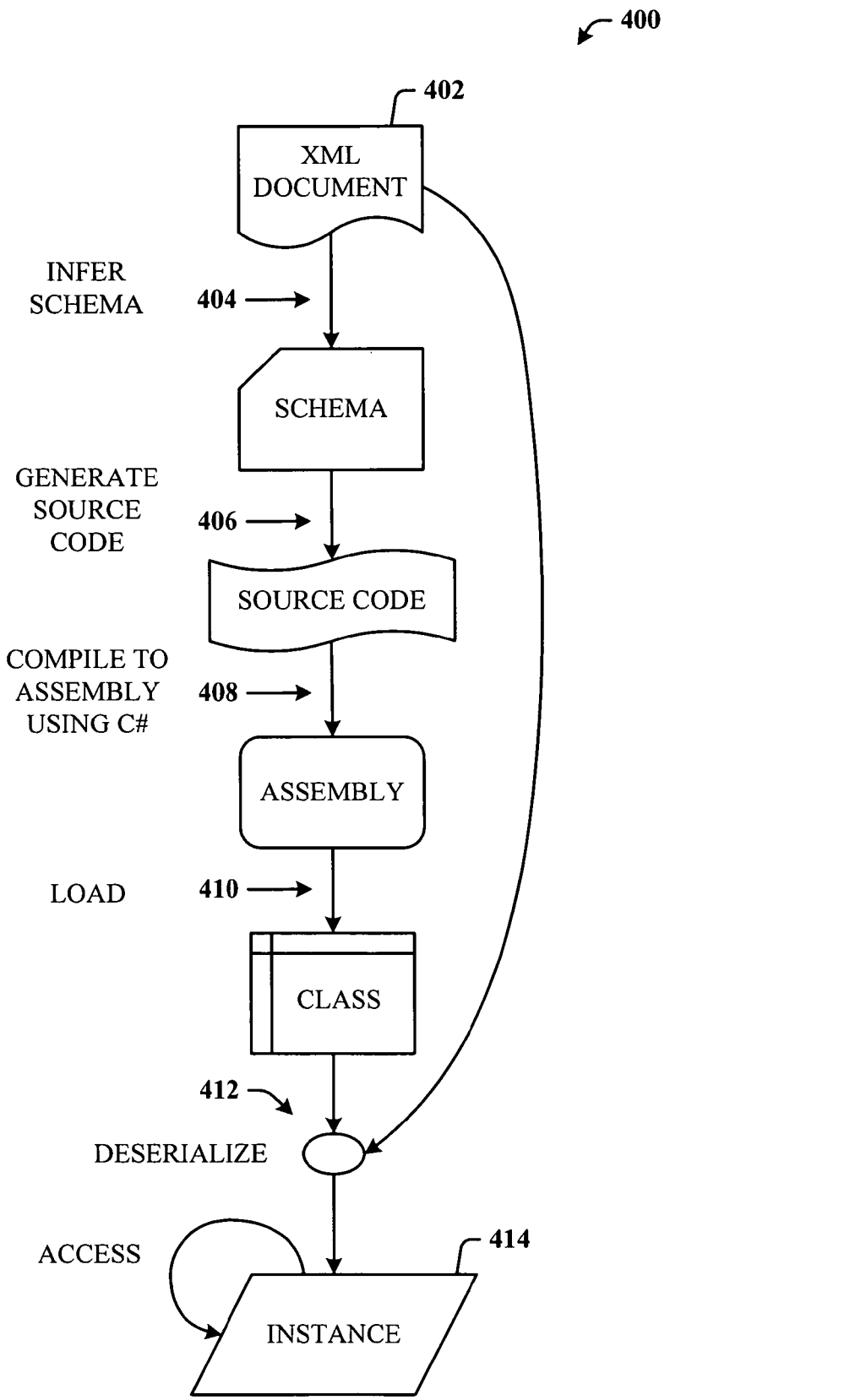
FIG. 4 illustrates a methodology of processing a runtime type inference of an XML document in accordance with the invention.

FIG. 4 illustrates a methodology 400 of processing a runtime type inference of an XML document 402 in accordance with the invention. In case of XML and object serialization, the schema can be used to generate source code using, for example, an existing xsd.exe tool in the NET-brand framework by Microsoft Corporation, compile the source code using the C# compiler, load the assembly into memory, and deserialize the original document as an instance of the just created and loaded class. However, there are many other alternative ways to generate classes from the inferred schema, such as Reflection.Emit, or a more lightweight form of runtime code generation. The .NET-brand Framework's Reflection namespace facilitates viewing assembly metadata and creating assemblies at runtime. Reflection allows the code to do type discovery, view assembly metadata, and invoke assembly code dynamically at runtime, for example.

Accordingly, there is provided the methodology such that the XML document 402 is received as input data to the runtime process 400. At 404, the schema is inferred at runtime based on actual values of the XML document 402. At 406, source code is generated from the inferred schema. At 408, the source code is compiled into assembly code using, for example, a C# compiler, which can be executable code. At 410, the XML document 402 types are processed using the assembly code to generate classes that are loaded into memory. At 412, the classes are used in deserialization of the original data input stream to create an instance 414 of the newly-created and loaded classes. The instance 414 can then be accessed efficiently and conveniently.

Referring again to the example pseudo code of FIG. 1, note that once the schema has been inferred, the generic XML serializer does not have to be used to deserialize the XML document into an object graph. Instead, type-specific code can be generated for serialization and deserialization as well, for example, by providing custom implementations of the ISerializable interface.

While this example is in terms of XML documents and schemas, the mechanisms are applicable equally well to other domains such as languages described by context-free grammars, relational tables described by relation schemas, etc. Additionally, instead of deserializing into objects, the mechanisms described in this invention apply equally well to generating any representation that is specialized using schema information (for instance a schema-specific DOM (document object model) or parse-tree). For example, the XML DOM is a programming interface for XML documents, and defines the way an XML document can be accessed and manipulated. A program called an XML parser can be used to load an XML document into the memory of a computer. When the document is loaded, its information can be retrieved and manipulated by accessing the DOM. The DOM represents a tree view of the XML document.

Figure 5:
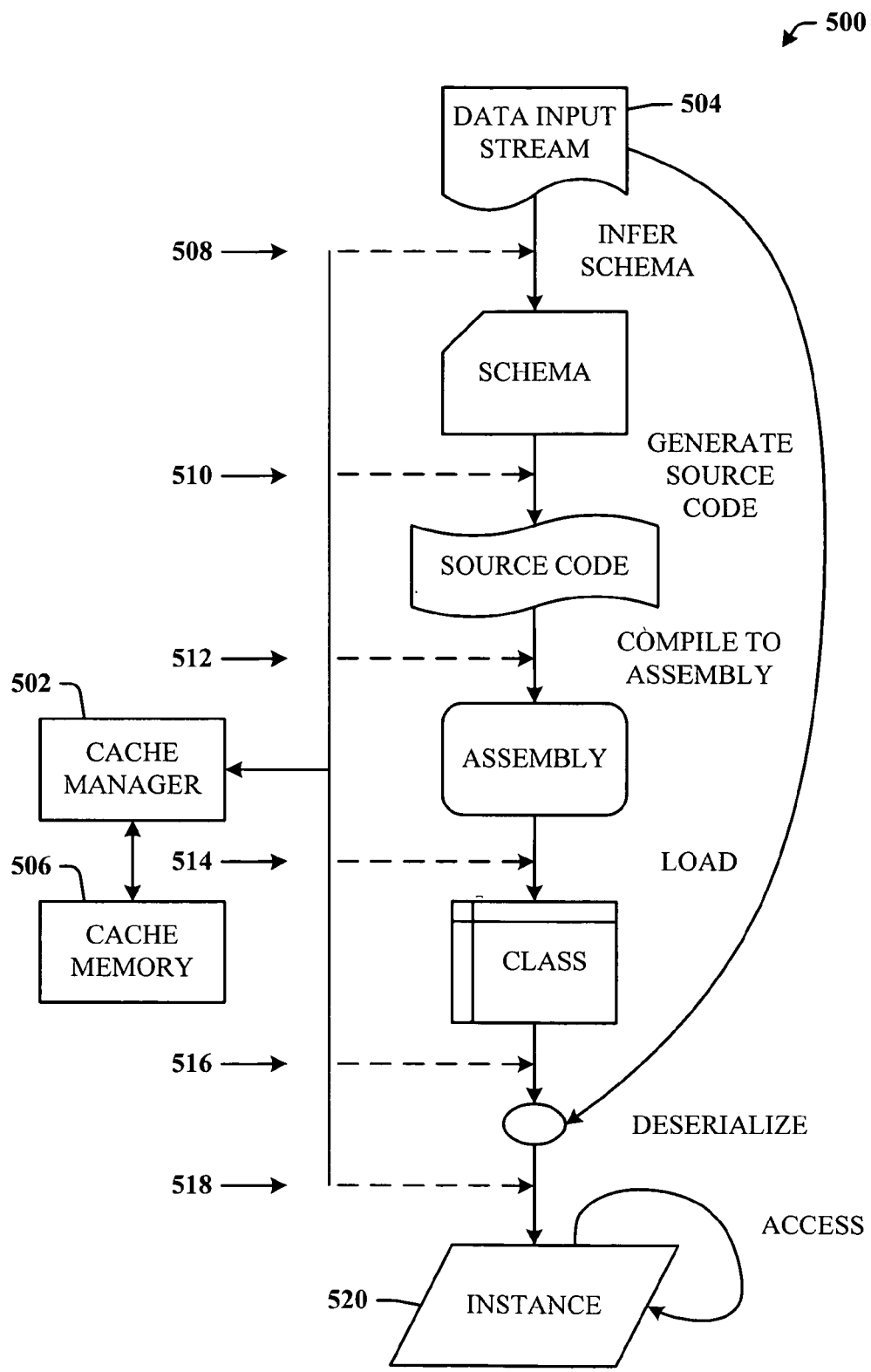
FIG. 5 illustrates a methodology of optimizing a runtime inference process by employing caching all or selected points of the process, in accordance with the invention.

FIG. 5 illustrates a methodology of optimizing a runtime inference process 500 by employing caching at all or selected points of the process 500, in accordance with the invention. The methodology includes a cache manager 502 that provides caching at all or selected points during the runtime process 500 by caching the input data 504 and/or interim data and/or code in a cache memory 506. At 508, an input stream of data 504 can be cached as it is received as input to the runtime process to provide faster access for generating the runtime schema. At 510, the schema can be cached for faster access and processing in order to generate the source code. At 512, the source code is compiled into assembly code, which can be executable code. The source code can be cached for faster access. At 514, the executable assembly code can be cached for faster access and processing against the input data types to generate classes that are loaded into the process memory. At 516, the class types can be cached in preparation for the deserialization process against the original data input stream. At 518, the output of the deserialization process, which is an instance 520 of the newly-created and loaded class, can be cached. This provides more efficient and convenient access to the instance 520.

Figure 6:
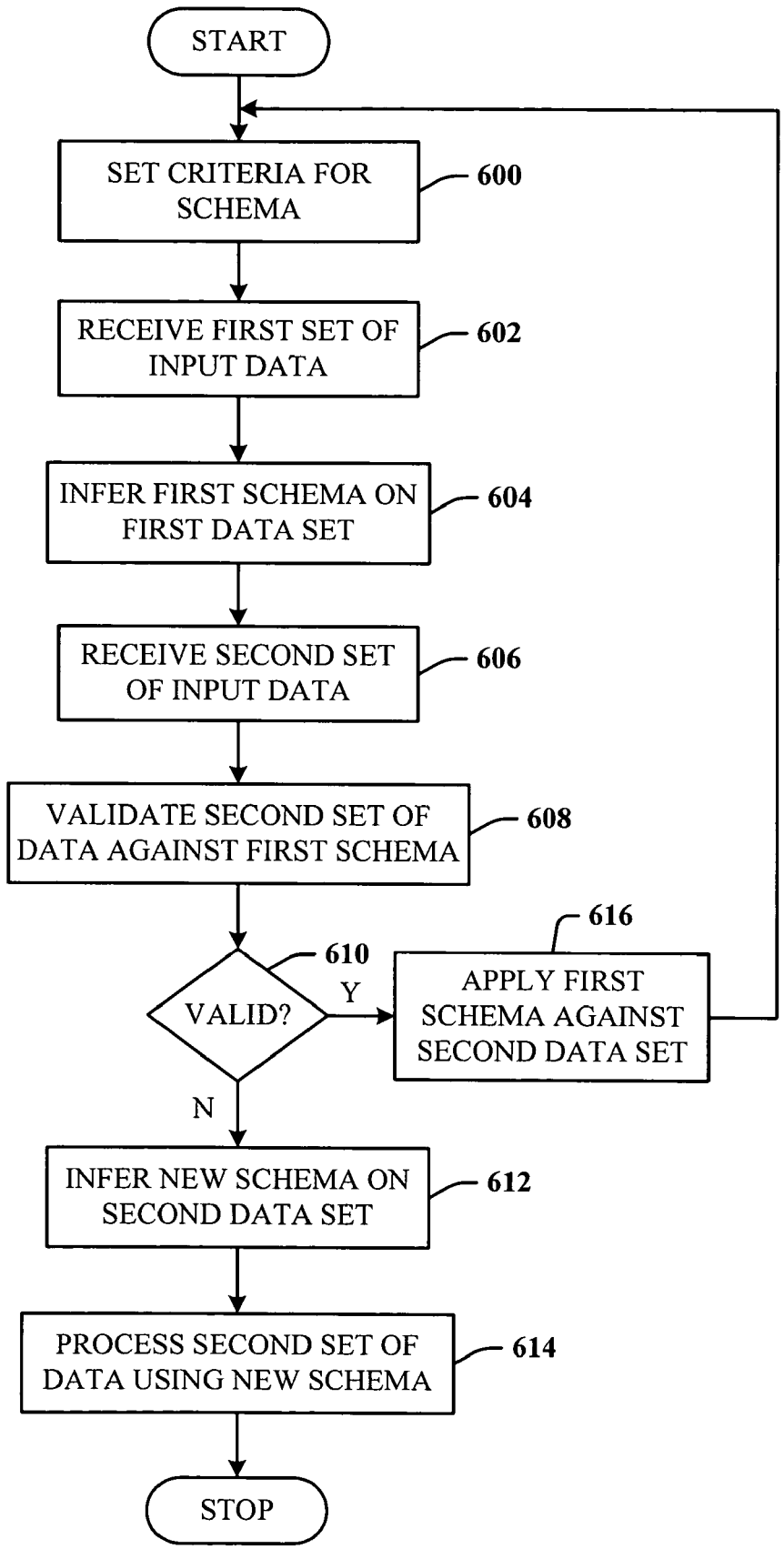
FIG. 6 illustrates a methodology of optimizing the processing of similar input data at runtime in accordance with the invention.

Referring now to FIG. 6, there is illustrated a methodology of optimizing the processing of similar input data at runtime in accordance with the invention. In the case where several documents are loaded in a row, for example, it may be desired to first validate the next document against the previously inferred schema and, if validation succeeds, a new schema need not be inferred. For example, after the first schema inferred at runtime, and the second data set is received, a metric is employed that compares the success (or failure) of the schema against the second data set. If the success falls below the criteria, a new schema is inferred from the second data set, and so on. Otherwise, the first schema continues to be applied against the second data set.

Accordingly, at 600, criteria are determined and employed for applying an inferred schema against multiple sets of similar data. At 602, a first set of input data is received. At 604, a first schema is inferred at runtime from the first data set. At 606, a second data set is received. At 608, a validation process is employed at runtime against the second data set using the first inferred schema. If validation is not successful, as checked at 610, flow is to 612 where a new schema is inferred from the second data set. At 614, the second data set is processed according to the second inferred schema, and in accordance with developing source code, compiling, deserialization, etc., of the previously described processes. Alternatively, at 610, if the validation is successful, the first inferred schema is applied against the second data set, as indicated at 616. Progress is then back to 600 to process the next data set.

This process is not limited to two iterations. For example, a third inferred schema can be derived if the first two schemas were not used, and so on. However, there should be a limit to the number or depth of which schemas will be inferred when employing substantially similar input data; otherwise, system performance can be impacted.

Figure 7:
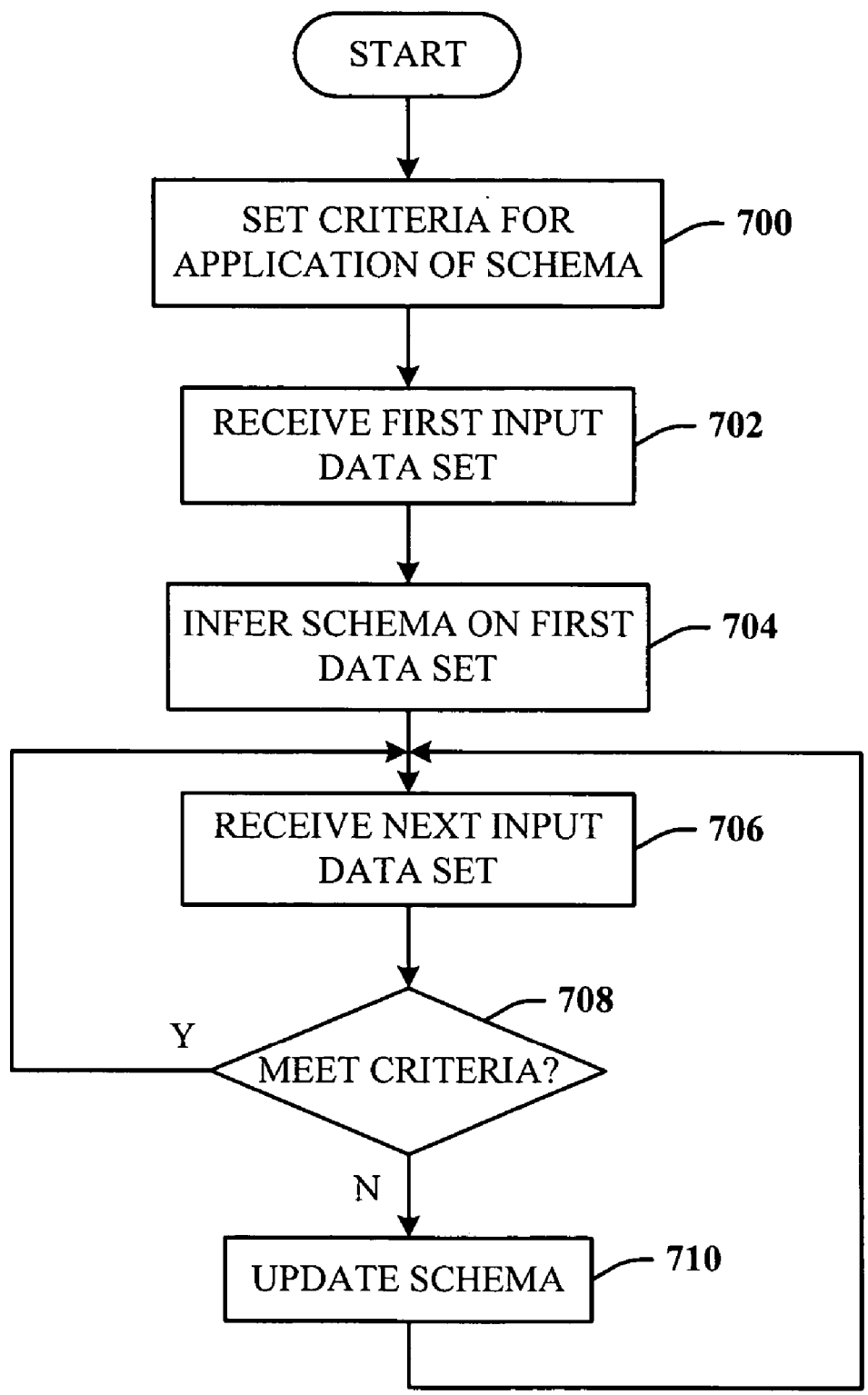
FIG. 7 illustrates a methodology of optimizing a runtime inference process by refining an inferred schema over time in accordance with the invention.

FIG. 7 illustrates a methodology of optimizing a runtime inference process by refining an inferred schema over time in accordance with the invention. The inferred schema can be refined over time whenever another document is loaded. Having a more precise type allows for more efficient access. Accordingly, at 700, criteria are set for application of the inferred schema to derive classes from input data types. For example, if the criteria were set relatively high, and the inferred schema, as processed against the input data, yielded an output that underperformed the criteria, the inferencing algorithm can be refined such that eventually, the inferred schema that is output would achieve the desired criteria. At that point, no more refinement would be processed.

At 702, a first input data set is received for inference processing at runtime. At 704, a schema is derived by an inferencing process based on the input data. At 706, the next input data set is received for processing. At 708, a check is made to determine if the inferred schema is performing according to the predetermined criteria. If yes, progress is back to 706 to receive the next data set. If performance is not meeting the desired criteria, flow is from 708 to 710 to update or refine the existing schema at runtime. Flow is then back to 706 to receive the next input data set for processing. Alternatively, the same input data set that caused the inferred schema to fail the criteria can be reprocessed using the updated schema to ensure that the optimal output is utilized at runtime.

Figure 8:
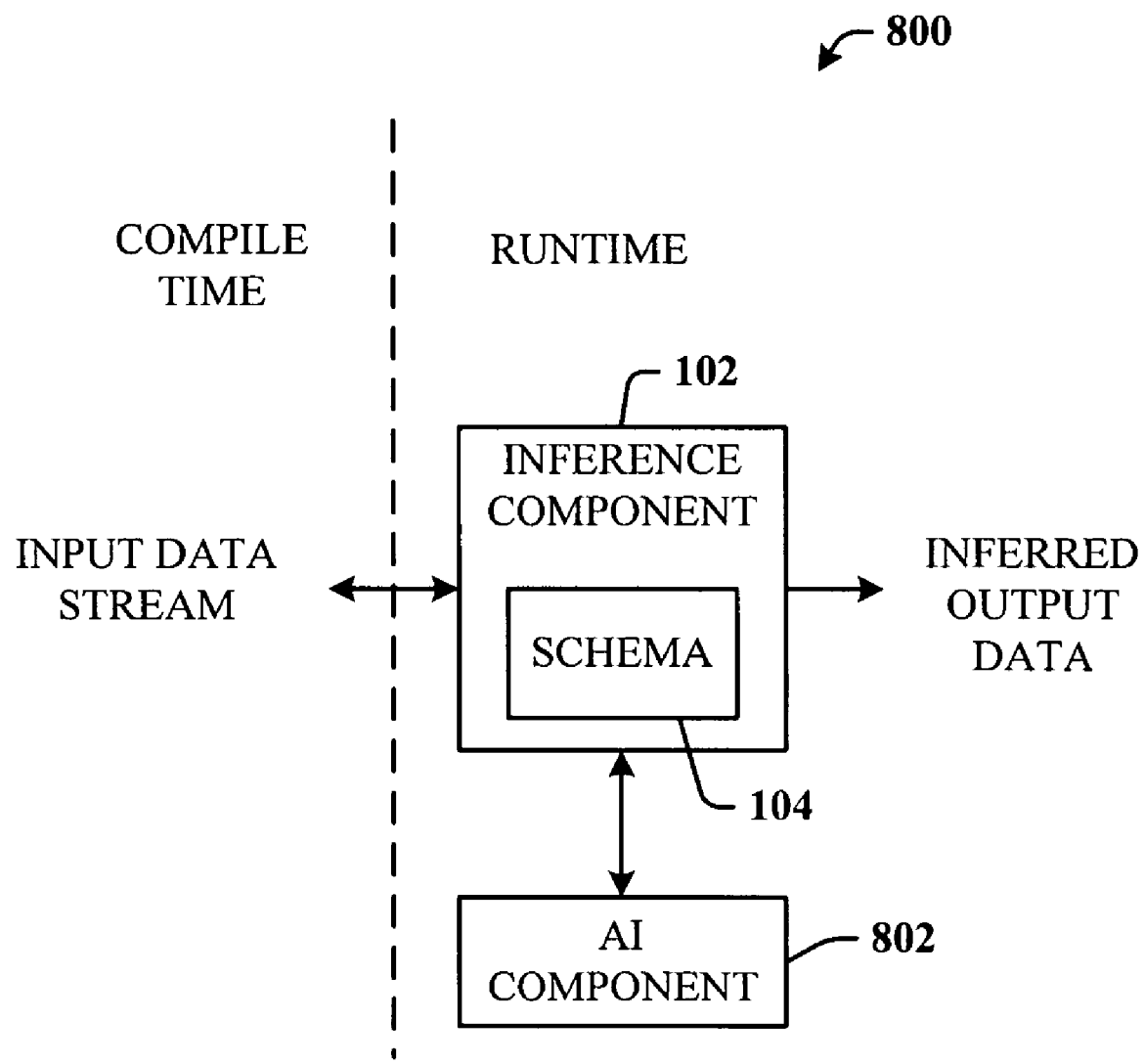
FIG. 8 illustrates a system that employs an artificial intelligence component which facilitates automating one or more features in accordance with the subject invention.

FIG. 8 illustrates a system 800 that employs an artificial intelligence (AI) component 802 which facilitates automating one or more features in accordance with the subject invention. The subject invention (e.g., in connection with inferring) can employ various AI-based schemes for carrying out various aspects thereof. For example, a process for determining when to refine either the predetermined criteria associated with updating the inferred schema or the inferred schema can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 9:
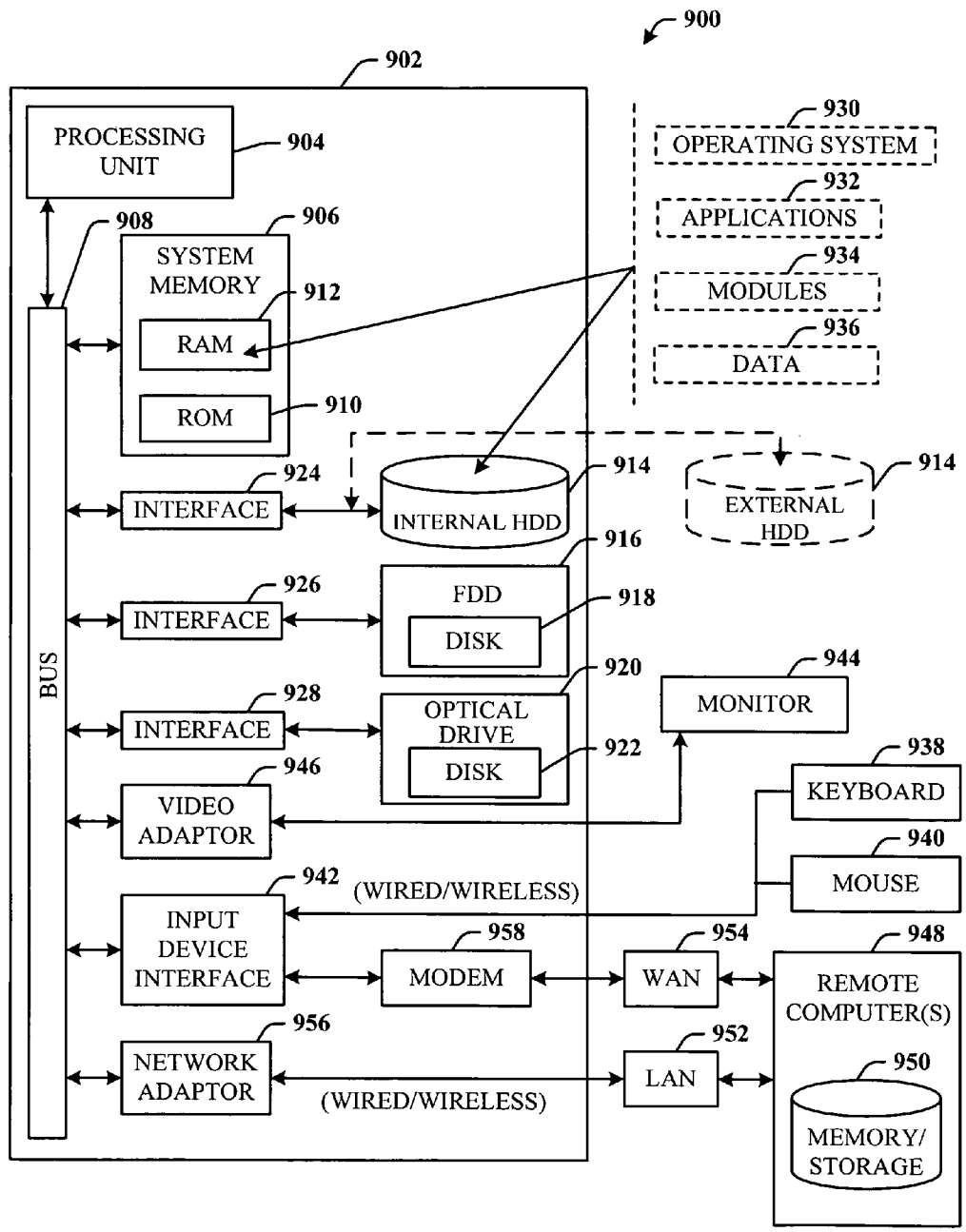
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
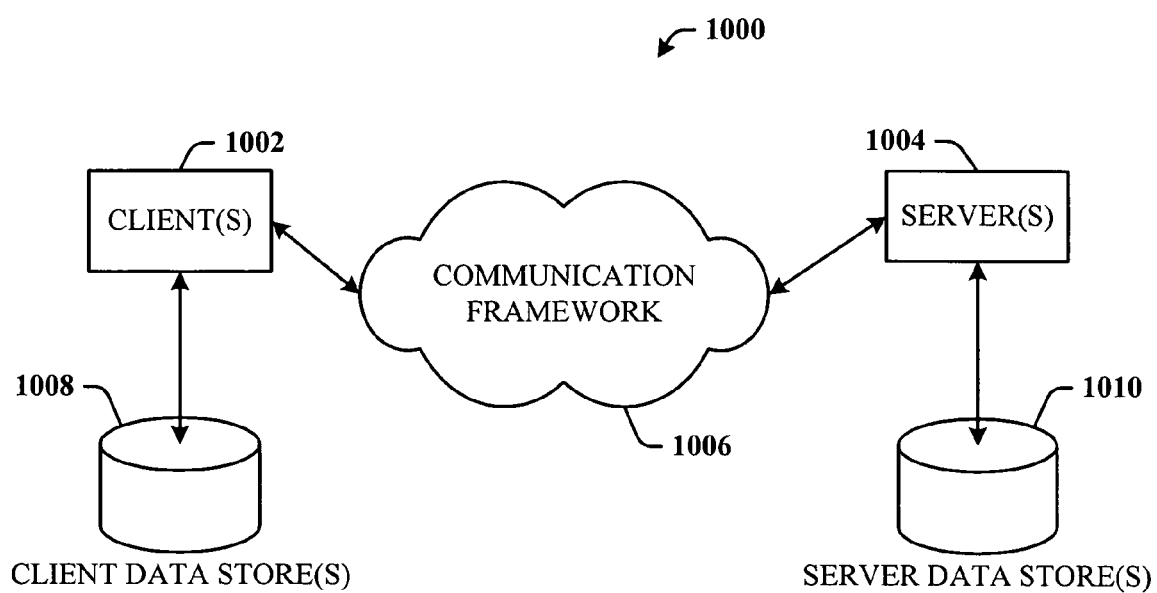
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. In a computing environment comprising a processor operatively coupled to a memory, a computer-implemented method for dynamically generating classes and instances of said classes from XML input data using runtime type schema inferencing, thereby facilitating efficient and convenient runtime late-bound access to dynamic data types, the method comprising:
   receiving a first input stream of XML input data from an XML document, wherein upon receiving the XML input data, a type schema of the XML input data is unknown;
   processing, at runtime, the XML input data in order to infer a type schema of the input data based on actual values of the input data of the first input stream, wherein the type schema represents an organization or structure of the input data of the first input stream which is unknown prior to being inferred;
   generating source code from the type schema and compiling the source code to generate one or more classes that represent the XML input data of the first input stream;
   loading the generated one or more classes into memory;
   generating an instance of each of the generated one or more classes and deserializing the XML input data of the first input stream to the one or more instances, thereby enabling late-bound access to the XML input data of the first input stream through the one or more instances;
   perform a caching operation for generation of the type schema during the runtime process;
   receiving a second input stream of XML input data from an XML document;
   processing, at runtime, the XML input data of the second input stream to validate the XML input data of the second input stream against the type schema, including determining whether the type schema is valid as to the XML input data of the second input stream, and
   if the type schema is valid as to the XML input data of the second input stream, applying the type schema against the XML input data of the second input stream, including deserializing the XML input data of the second input stream into an instance of the generated one or more classes to thereby enable late-bound access to the XML input data of the second input stream through the one or more instances; and,
   if the type schema is not valid as to the XML input data of the second input stream:
      inferring a new type schema based on actual runtime values of the XML input data of the second input stream,
      produce source code from the new type schema, compile the source code into assembly code, and process the assembly code to generate one or more new classes that are loaded into memory, the one or more new classes representing the XML input data of the second input stream,
      generating an instance of each of the one or more new classes, and
      deserializing the XML input data of the second input stream to the one or more instances of the one or more new classes to thereby enable late-bound access to the XML input data of the second input stream through the one or more instances of the one or more new classes.

2. A computer-implemented system that facilitates data access, the system comprising a processor operatively coupled to a memory and containing one or more computer readable storage media having thereon computer-executable instructions that, when executed by the processor, carry out the method of claim 1.

3. The computer-implemented system of claim 2, further comprising an artificial intelligence component that employs a probabilistic and/or statistical-based analysis to prognose or infer an action that a user desires to be automatically performed.

4. A server that employs the computer-implemented system of claim 2.

5. The computer-implemented system of claim 2, further comprising a caching component that caches at least one of the XML input data, the type schema, the generated source code, assembly code generated by compiling the source code, or deserialization information during the runtime process during runtime.

6. The method of claim 1, further comprising updating the type schema over time based on at least one additional stream of XML input data.

7. The method of claim 1, further comprising validating the type schema against new XML input data.

8. The method of claim 1, further comprising updating the type schema over time based on changes in predetermined criteria related to the XML input data.

9. The method of claim 1, further comprising caching at least one of the XML input data, the type schema, the generated source code, assembly code generated by compiling the source code, or deserialization information during the runtime process.

10. The method of claim 1, further comprising validating the type schema against new XML input data during the runtime process.

11. At a computing system comprising a processor operatively coupled to a memory, one or more computer storage media containing computer-executable instructions that facilitate inferring a type schema of XML data, generating dynamic classes that embody the type schema, and instantiating object representations of said classes with the XML data, thereby enabling static access to data types that were unknown prior to inferencing, the computer executable instructions, when executed, cause the computing system to perform the following:

receive a first stream of XML input data;

process the first stream of XML input data to infer a type schema based on actual runtime values of the first stream of XML input data, wherein the type schema represents an organization or structure of the XML input data of the first stream which is unknown prior to being inferred, produce source code from the type schema;

compile the source code into assembly code, wherein the assembly code is executable code;

process the assembly code to generate one or more classes that are loaded into memory, the one or more classes representing the XML input data of the first stream;

generating an instance of each of the generated one or more classes;

deserialize the XML input data of the first stream to the one or more instances to thereby enable late-bound access to the XML input data of the first stream through the one or more instances;

perform a caching operation for generation of the type schema during the runtime process;

receive a second stream of XML input data;

process the second stream of XML input data to validate the XML input data of the second stream against the type schema, including determining whether the type schema is valid as to the XML input data of the second stream and, if the type schema is valid as to the XML input data of the second stream, applying the type schema against the second stream of XML input data, including deserializing the XML input data of the second stream into an instance of the generated one or more classes to thereby enable late-bound access to the XML input data of the second stream through the one or more instances; and, if the type schema is not valid as to the XML input data of the second stream:

inferring a new type schema based on actual runtime values of the second stream of XML input data, produce source code from the new type schema, compile the source code into assembly code, and process the assembly code to generate one or more new classes that are loaded into memory, the one or more new classes representing the XML input data of the second stream, generating an instance of each of the one or more new classes, and deserializing the XML input data of the second stream to the one or more instances of the one or more new classes to thereby enable late-bound access to the XML input data of the second stream through the one or more instances of the one or more new classes.

12. The one or more storage media of claim 11, wherein the caching operation includes caching one or more of the XML input data of the first stream, the type schema, the generated source code, the assembly code, or deserialization information during the runtime process.

* * * * *